United States Patent [19]

Zion

[11] 4,025,686
[45] May 24, 1977

[54] MOLDED COMPOSITE ARTICLE AND METHOD FOR MAKING THE ARTICLE

[75] Inventor: Earl M. Zion, Newark, Ohio

[73] Assignee: Owens-Corning Fiberglas Corporation, Toledo, Ohio

[22] Filed: June 26, 1975

[21] Appl. No.: 590,647

[52] U.S. Cl. .............................. 428/310; 428/325; 428/327; 428/402; 264/46.5

[51] Int. Cl.² .......................................... B32B 3/26

[58] Field of Search .......... 428/306, 308, 309, 310, 428/311, 314, 315, 325, 327, 331, 402, 403, 406; 260/2.5 F; 264/46.5

[56] References Cited

UNITED STATES PATENTS

| | | | |
|---|---|---|---|
| 3,707,414 | 12/1972 | Wismer et al. | 428/313 |
| 3,707,434 | 12/1972 | Stayner | 428/308 |
| 3,835,208 | 9/1974 | Koutitonsky | 428/315 |
| 3,849,350 | 11/1974 | Matsko | 260/2.5 F |

Primary Examiner—William J. Van Balen

Attorney, Agent, or Firm—John W. Overman; Ronald C. Hudgens; Charles R. Schaub

[57] ABSTRACT

A resinous article and method for making the article wherein a body of fibrous reinforcing material and syntactic foam containing a low density filler are placed in a molding and curing chamber with the reinforcing material in contact with the surface of the chamber. A molding pressure is then exerted on the chamber to mold and cure the body of material into a finished article. The pressure exerted being sufficient to force a portion of the resinous material in the syntactic foam through the reinforcing material to form a resin rich surface on the article. However, the low density filler material is retained within the core area of the article by the reinforcing material and forms a lightweight syntactic foam core. The resulting article has an outer skin, a layer of fibrous reinforcing material beneath the skin and bonded to the skin, and a core of lower density syntactic foam.

9 Claims, 22 Drawing Figures

MOLDED COMPOSITE ARTICLE AND METHOD FOR MAKING THE ARTICLE

BACKGROUND OF THE INVENTION

This invention relates to a new and improved composite molded article and to a method for producing such articles having outer skins, a glass fiber reinforced layer and a core of lower density material containing a filler.

In the development of processes for producing molded articles from polymerized resinous materials, the desirability of increasing the strength by the inclusion of high tensile strength fibers, in particular, glass fiber material, has long been recognized. The molding of such reinforced articles generally involves bringing the resin and resin-reinforcing fibers together, shaping them to a desired configuration, and holding the shape until the resin has cured or set to hold the desired shape permanently.

A common technique for production of reinforced articles involves the use of pre-forms of glass fibers prepared by collecting chopped strands of glass on a screen conforming to the shape of the part. The pre-form is then inserted into a mold and saturated with a polymerizable resin and a foamable material. Cure of the foam and resin produces a rigid article. Such rigid plastic foams have found varied use in industry; for example, large panels can be employed as structural units for wall or ceiling panels, walk-in refrigerators, cold-room liners, all-weather buildings and in recreational vehicles and boats.

If the article to be molded is essentially planar or of little depth or curvature, pre-cut glass mats can be used in place of pre-forms and are placed within the mold as described above or cut to shape and manually fit to the mold. When the molded article is large or when it is desired that the article have a low density, for buoyancy properties, etc., the use of liquid resins containing a low density particulate filler has become widespread, in addition, of course, to the common use of conventional foams in which the liquid resin contains a blowing agent to create voids when cured. Foams of the former type include those known as syntactic foams containing previously formed bubbles of various materials or, more broadly, a particulate filler of lower density than the resin itself.

In many applications, conventional or syntactic foams are used with glass fiber reinforcing layers or chopped fibers in composite articles having a non-foamed outer shell which presents a smooth and blemish free surface. Aside from those processes in which a non-porous skin is formed about a foamed core in a single injection or molding operation, as typified by U.S. Pat. No. 3,268,636, most composite articles are fabricated essentially as a laminate in which a pre-formed, impervious shell of a thermoplastic sheet is filled with the foam material, with the layer or layers of fiber reinforcement positioned somewhere within the foam core, preferably near the outer shell where the reinforcement function is most needed.

For example, U.S. Pat. No. 3,503,841 discloses a sandwich-type structure having at least one outer skin formed from a polyvinyl chloride sheet and a polystyrene foamed core containing short chopped asbestos or glass fibers throughout the core. This approach, using chopped fibers distributed throughout the core, will provide a satisfactory product for many uses but is not as satisfactory from a strength standpoint for large structures as are composites in which the fiber reinforcement is in the form of woven or matted layers positioned near the skin of the composite.

U.S. Pat. No. 3,711,581 discloses a process for fabricating a composite article having pre-formed impervious thermoplastic skins, a foamed polyurethane core and layers of a glass fiber or other fibrous mat adhered to the inner surfaces of the skins. The process specifically provides for adhering the fibrous mat to the skin by a separate application of a bonding agent to the skin's inner surface, then a second separate application of the bonding agent to the fibrous mat before foaming the core. The use of the separate bonding agent on each surface prior to foaming recognizes the importance of obtaining good adhesion between the fibrous mats and the skin necessary for the fibrous layer to perform its reinforcing function for the skin where the highest stresses will occur.

U.S. Pat. No. 3,591,444 discloses a process which endeavors to eliminate the necessity of a separate bonding agent as used in the aforementioned '841 patent. Recognizing the importance of the bond between the outer skin and the fibrous mat, the structure utilizes a random fiber, three-dimensional fleece adjacent the inner surface of the conventional woven fiber pre-preg such that individual fibers of the fleece extend laterally into the core and in the opposite direction into the woven mat while at the same time, the fleece and mat restrict the foaming action so that, hopefully, a more dense resin-rich marginal area is provided adjacent the outer skin. The use of the pre-impregnated mat adjacent the fleece is necessary to assure adherence of this mat to the outer skin or gel coat, if one is used; otherwise, the pre-preg mat forms the outer skin and is bonded to the core through the laterally extending fleece.

Each of the above summarized processes, recognizing the criticality of the bond between an impervious outer shell and the adjacent fibrous mat, appear to solve the problem with the use of added adhesive layers or additional constituents such as the fleece used in the '444 process. None appear to be suitable for use with syntactic type foams wherein the particulate filler is carried by the moving liquid resin under pressure, as opposed to conventional foams wherein the liquid resin itself is moved by the expanding gaseous bubbles. In particular, it would appear that the function of the fleece in the '444 process above would be destroyed by the particles of filler in a syntactic foam which would push the laterally extending fleece fibers back into the plane of the skin, mat and fleece upon the application of pressure.

It is accordingly an object of this invention to provide a process for producing a composite article having an impervious outer skin adhered to a fibrous mat which surrounds a lower density core wherein the resin of the core material acts as the binder or adhesive between the skin and mat surfaces, to thus eliminate separate adhesive or other elements heretofore necessary to improve this bond.

SUMMARY OF THE INVENTION

An object of this invention is an improved method for molding a reinforced resinous article having a lightweight core.

Another object of this invention is to provide a low cost molding operation for making reinforced syntactic foam articles.

Yet another object of this invention is an improved reinforced resinous article having a lightweight core wherein the lightweight core is securely bonded to the rest of the article.

Still another object of this invention is an improved lightweight reinforced resinous article having thermoplastic skins securely bonded to the rest of the article.

In a broad sense these and other objects of the invention are obtained by a method where syntactic foam containing a resinous material and hollow microspheres is molded. A mold cavity is supplied with a fibrous reinforcing material and the syntactic foam added on top of the reinforcing material. The material in the mold cavity is put under pressure during the molding operation. The pressure forces a portion of the resinous material in the syntactic foam through the fibrous reinforcing material to form a resin rich skin on the surface of the article. The microspheres are inhibited from passing through the reinforcing material so they tend to remain in the core region of the article. The microspheres and remaining resinous material form a lightweight syntactic foam core in the center of the article. The resinous material forms a strong bond between the exterior skin, the fibrous reinforcing material and the syntactic foam core.

Other objects and advantages of the invention will become apparent as the invention is described hereinafter in more detail and with reference made to the accompanying drawings.

DESCRIPTION OF THE PREFERRED EMBODIMENTS

The article and method of manufacturing the article of this invention are particularly useful in processes where there is a need to mold a strong lightweight reinforced resinous article. Since the article must be lightweight a syntactic foam comprising glass, ceramic or plastic microspheres or other low density particulate filler and liquid resinous material may be used for the resinous body of the article. The reinforced article is made by placing the syntactic foam and fibrous reinforcing material in a cavity between two molds made from relatively inexpensive easy to form materials. The molds are then brought together, by a small press, under relatively low pressure, to mold the syntactic foam and fibrous reinforcing material into the finished article. During the molding operation the pressure exerted on the syntactic foam forces a portion of the liquid resin through the fibrous reinforcing material to the exterior surface of the article. Since the liquid resin moves through the reinforcing material there is a resin rich area on the exterior surface of the molded article. The resin rich surface provides a very strong rigid surface on the article. The microspheres, because of their size, are too large to move easily through the fibrous reinforcing material and remain in the core of the article along with the rest of the liquid resin. This provides a lightweight syntactic foam core that make the article relatively lightweight. Since there is resinous material through the article there is a continuous bonding between the various components of the article. Thus, the lightweight core and resin rich surface are bonded to the fibrous reinforcing material, curing produces a rigid article having fibrous reinforcing material layers, a low density core, and a relatively smooth and impervious resin-rich layer over the outer surfaces of the fibrous reinforcement layers. The process can also incorporate one or more thermoplastic sheets bonded to fibrous reinforcement by the resin rich layer to provide an impervious outer skin on the exterior of the article.

The low pressure molding used in the process also has the advantage that inexpensive molds and presses can be used to make the article. Therefore, since the cost of the equipment is lower the articles can be made at an attractive price even when the volume is low.

Figure 1:
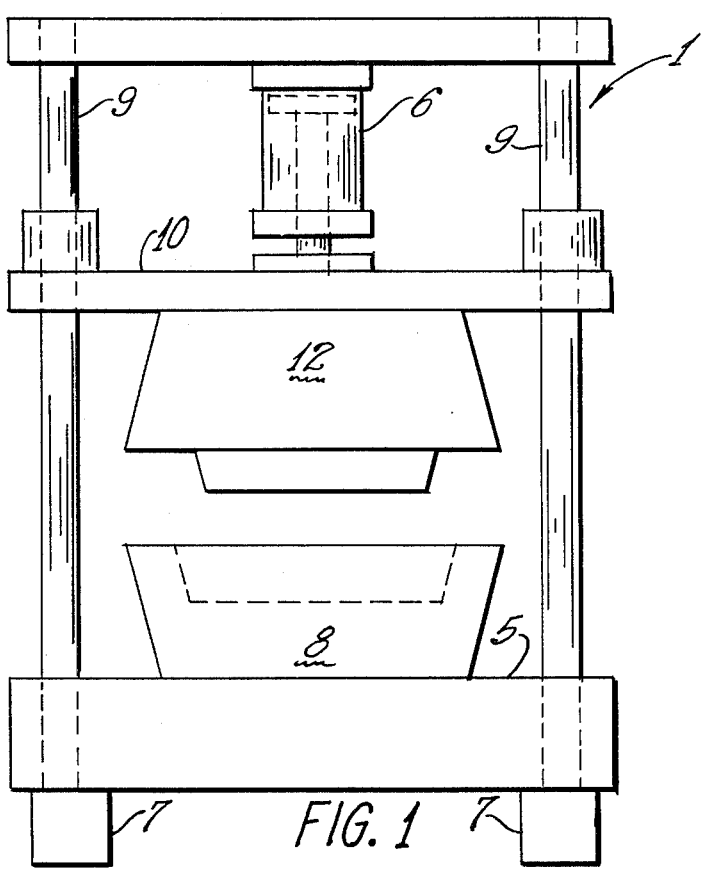
FIG. 1 is a front view of the apparatus used to mold the article where the molds are in the open position.
Figure 2:
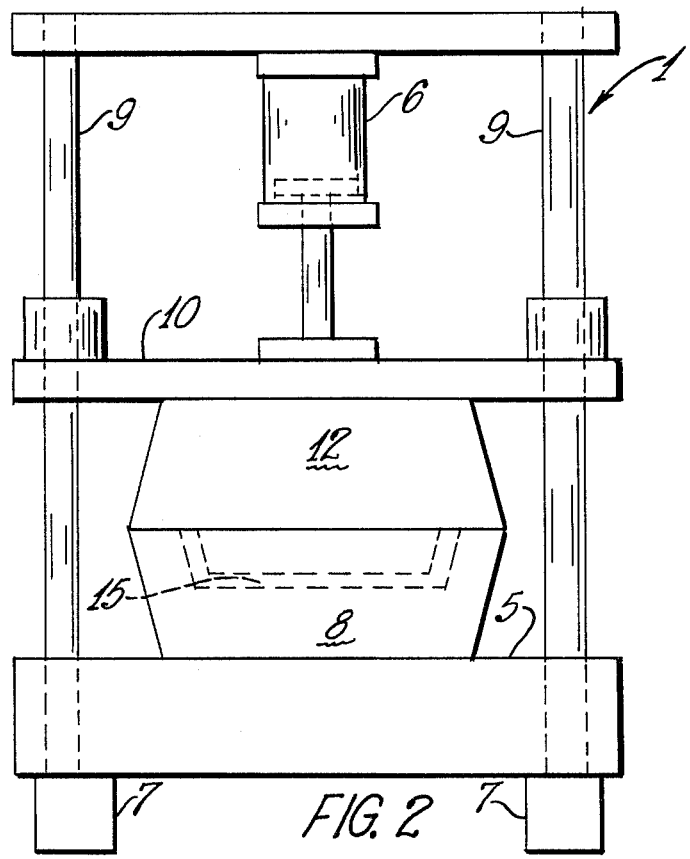
FIG. 2 is a front view of the apparatus used to mold the article where the molds are in the closed position.

The invention may be best understood by initially referring to FIGS. 1 and 2 which show the apparatus for molding an article. The molding apparatus 1 contains a table or base 5 that is supported on legs 7. The base 5 supplies the surface upon which the lower or female mold 8 rest. The base 5 also is the support for the press that is used to close the molds and supply the molding pressure. The press has side guide members 9 and a top member 10. The upper or male mold 12 is secured to the top member 10 of the press. The top member 10 is movable and is held in proper position by side guide members 9. A hydraulic cylinder 6 is connected to the top member 10 and is used to move the top member 10. When the hydraulic cylinder is actuated it moves and this movement is translated to the top member 10. FIG. 1 shows the top member 10 and the male mold 12 in a position near the upper limit of their movement. Since the male mold 12 is connected to the top member 10 it also moves when the top member is caused to move. Of course an air bag, a mechanical device or other suitable drive means could be employed to move the top member of the press.

FIG. 2 shows the top member 10 and the male mold 12 in their lower most position. The male mold 12 and female mold 8 are closed and define a mold cavity 15 when in this position. Also the top member 10 supplies pressure to the molds so that material placed in the mold cavity 15 will also be under pressure.

The above described molding press and molds are for demonstration purposes only and it should be recognized that a variety of presses and mold arrangements could be utilized without departing from the scope of the present invention.

Figure 3:
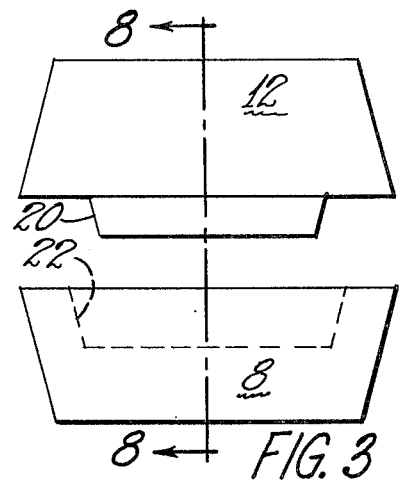
FIG. 3 is a front view of just the molds, in the open position, used to mold the reinforced resinous article.
Figure 4:
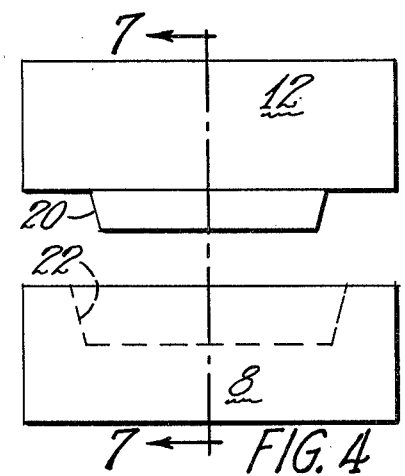
FIG. 4 is a side view of the molds, in the open position, used to mold the reinforced resinous article.
Figure 5:
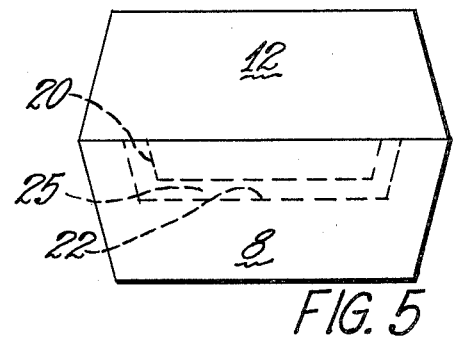
FIG. 5 is a front view of the molds in the closed position.
Figure 6:
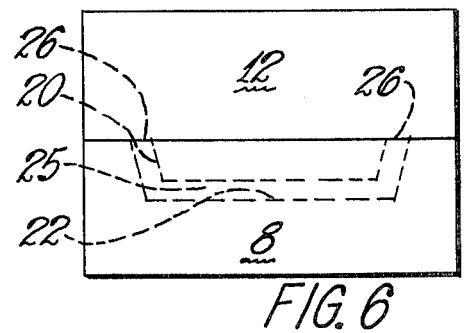
FIG. 6 is a side view of the molds in the closed position.

FIGS. 3 and 4 show the male 12 and female 8 molds without the molding press. The male mold 12 has a projecting surface 20 on the lower region of the mold. The projecting surface 20 is designed so that it fits into the depression 22 formed in the female mold 8. When the molds are brought together as shown in FIGS. 5 and 6 the projecting surface 20 and the depression 22 create a molding cavity 25. The cavity 25 has the same shape as the article that is to be molded. The end regions 26 of the cavity 25 create a seal so that material placed in the molding cavity will not escape when put under pressure by the molding press.

Since the pressures used in this molding process are relatively low the molds do not have to be as strong as in regular match die molding where steel dies are usually necessary. Instead readily formable low cost materials can be used for the dies or molds. These materials include wood, cast metals, reinforced sheet metal stampings, plaster of paris or plastic materials. Of these materials, reinforced plastics have proven especially useful in making the molds. All of these materials are easily formable into a mold form which is substantially unlimited in size and which might be subsequently altered when a design is changed, without greatly increasing the mold cost. As the molds can be made from inexpensive easily formable materials the cost of the tooling and molds are greatly reduced.

Figure 7:
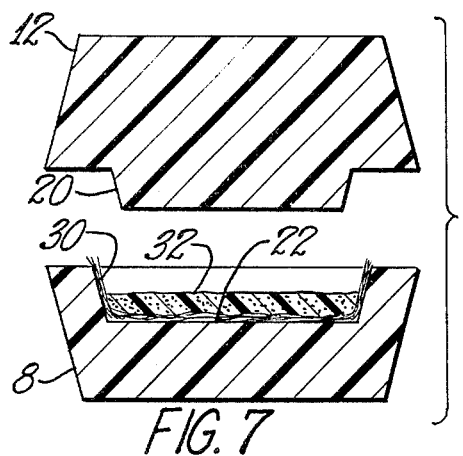
FIG. 7 is a cross section of the molds taken along line 7—7 in FIG. 4.
Figure 8:
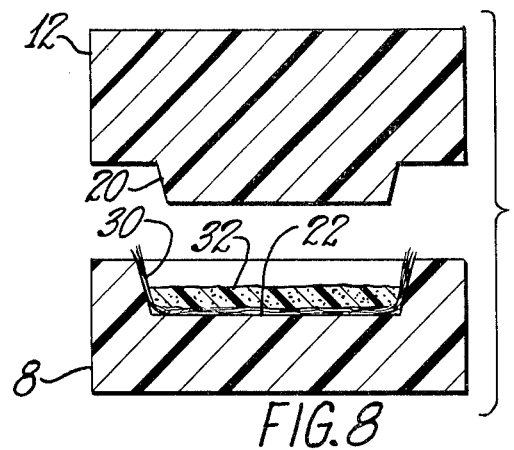
FIG. 8 is a cross section of the molds taken along line 8—8 in FIG. 3.

FIGS. 7 and 8 again show the molds in a spaced apart relationship. When the molds are in this position the fibrous reinforcing material 30 and the syntactic foam 32 can be placed in the molds. In the drawings the reinforcing material and syntactic foam has been placed in the lower or female mold 8. The fibrous reinforcing material 30 should be positioned so that it extends completely over one surface of the article to be molded. This will help to promote a complete and uniform distribution of fibrous reinforcing material in the finished molded article.

Almost any type of fibrous reinforcing material can be used to provide added strength to the finished article. However, it has been found in practice that a reinforcing material made from glass fibers is especially useful in making such molded articles. The glass fibers can be in a variety of forms when used to reinforce the resinous liquid. Continuous strand mats, chopped strand mats, chopped roving and preforms can all be used when a glass fiber material is used as the reinforcing material. However, the glass fibers or other reinforcing material should not be loose but they should be in a matrix form like a sheet or preform. This will allow the reinforcing material to adhere to the molds so it does not move out of position during the molding operation. The reinforcing material can be held in place on the mold surface by a layer of tacky gel coat or any other suitable temporary means. This will help to ensure that the reinforcing material is not displaced by the syntactic foam as it flows under pressure. Once the syntactic foam starts to fill out the molding cavity it will hold or push the reinforcing material against the surfaces of the mold cavity.

The syntactic foam material 32 placed in the female mold 8 can be made from a polyester, epoxy or other suitable thermosetting resinous material used in molding reinforced articles. The resinous material usually contains a catalyst and accelerator that allows the resin to cure under low pressures and without heated tools. This helps to simplify the system and keep the molding cost low. However, external heat can be supplied to the molds in addition to the chemicals used to cure the article. The external heat may even help to improve the skin region of the article. The syntactic foam 32 contains a relatively uniform distribution of small microspheres. The microspheres may be resilient and can be compressed when subjected to an external pressure. However, the microspheres cannot be put under too great a pressure as they are relatively fragile and will collapse at higher pressures. Therefore, there is a pressure range under which the microspheres can effectively operate. It has been found that a range of 50-150 psi pressure works very well when molding a syntactic foam containing microspheres. This pressure range also allows small presses and plastic molds to be used in the molding process. These components are less expensive and consequently the cost of molding the part is less. However, pressures above 600 psi should be avoided as they tend to collapse the microspheres.

The microspheres are usually hollow thermo-plastic spheres or hollow glass spheres that are very light and that tend to act, to some extent, as a lightweight filler in the syntactic foam. Thus, the resulting part is usually lighter when microspheres are added to the resinous material to make a syntactic foam. Also the microspheres are relatively inexpensive on a volume basis and can reduce the amount and the cost of the resinous material required in the syntactic foam to mold a part. By controlling the amount of microspheres added to the syntactic foam it is possible to control the density of the core of the molded article. A range of 1-15% by weight of microspheres is recommended or most syntactic foams and experience has shown that 1-10% by weight of microspheres usually works satisfactorily. Of course the percentage of microspheres will have to be adjusted based on the resinous material selected, the brand of microspheres, the size of the microspheres, and the properties desired in the finished article. Therefore, it may be necessary to select the proper mixture of resinous material and microspheres in the syntactic foam based on a trial and error process.

It is also possible to add milled glass fibers to the syntactic foam as a filler. The milled glass fibers will not replace the microspheres but will act as an additional filler along with the microspheres. The milled glass fibers may also help to improve the strength of the syntactic foam core of the molded article.

Figure 9:
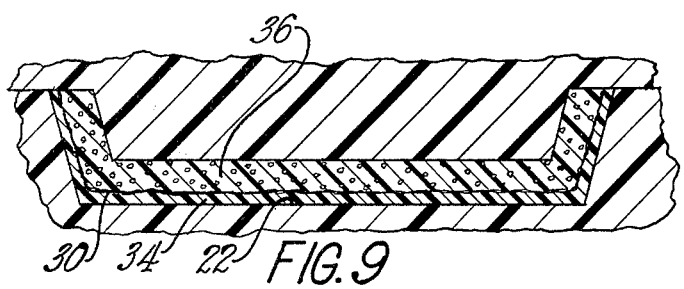
FIG. 9 is an expanded view of the closed mold cavity with the fibrous reinforcing material and syntactic foam in the mold cavity.

FIG. 9 shows the mold cavity when the molds are in the closed position and the syntactic foam and fibrous reinforcing material have been put under the molding pressure. Under these conditions the liquid resin in the syntactic foam is forced through the fibrous reinforcing material 30, by the molding pressure, to the interior surface of the mold 22. This forms a hard tough resin rich area 34 on the surface of the article. As the microspheres are too large to move through the fibrous reinforcing material so they remain in the center or core portion of the article. This produces a layer or section of lightweight syntactic foam 36 behind the resin rich surface 34 and layer of fibrous reinforcing material 30. This produces a product (FIG. 10) with a hard tough skin 34, a layer of fibrous reinforcing material 30 for strength and a lightweight core 36. Of course it should be noted that the orientation of the skin, the fibrous reinforcing material and the lightweight core can be varied so that the end product has the desired characteristics.

Figure 10:
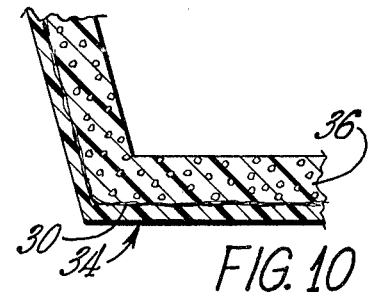
FIG. 10 shows a portion of the article molded in the apparatus shown in FIG. 9.

When molding an article as shown in FIG. 10 it is very important that the right molding pressure be used. If the molding pressure is not high enough there will not be enough force to move the resin of the syntactic foam through the fibrous reinforcing material. If the resinous material does not move through the fibrous reinforcing material there will be no resin rich surface and there will be no separation between the microspheres and resinous material. On the other hand if the molding pressure is too high there will be a chance that the microspheres will collapse or that there will be enough pressure to force the microspheres through the reinforcing material. Therefore, the molding pressure must be regulated so that the resinous material and microspheres will be separated to some extent by the fibrous reinforcing material. In practice it has been found that a molding pressure in the range of 50–150 psi will work very satisfactorily in this type of molding operation. It has also been found that pressures over 600 psi should be avoided as they will usually collapse the microspheres.

It should be recognized that the end product can be varied by varying the molding pressure used to form the article. Pressures at the top of the molding pressure range will force more resinous material through the reinforcing material and form a thicker stronger skin on the article. As more resinous material is forced into the skin there is less resinous material and more microspheres left in the core area of the microspheres. Consequently, the article will have a very lightweight core region. Pressures in the lower end of the molding range will force less resinous material through the fibrous reinforcing material and form a thinner skin on the article. At the same time there will be more resinous material left in the core with the microspheres so the article will have a stronger heavier core region.

It is also important that the microspheres be distributed relatively uniformly throughout the syntactic foam. This will help to insure that the lightweight core, that is formed during the molding process, will be relatively uniform without severe weak spots. It is also important that the size of the microspheres be controlled so the microspheres cannot normally pass through the fibrous reinforcing material. It has been found in practice that microspheres in the range of 10 to 130 microns will work very well in the syntactic foam.

Since some types of microspheres are relatively resilient and they may compress during the molding operation when subjected to the molding pressure. The microspheres may possibly expand, during the curing of the article, to compensate for any shrinkage of the resinous material in the syntactic foam. The expansion of the microspheres would help to keep the article in contact with the surface of the molds during curing. When the article is kept in contact with the smooth mold surfaces this helps to promote a good surface finish on the molded article.

Figure 11:
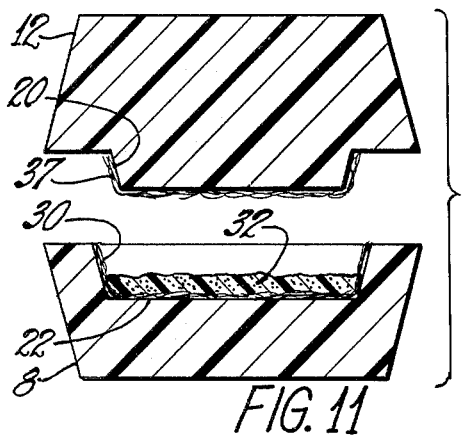
FIG. 11 shows a front view of the apparatus used to mold the article where the molds are in the open position and additional reinforcing material has been added.
Figure 12:
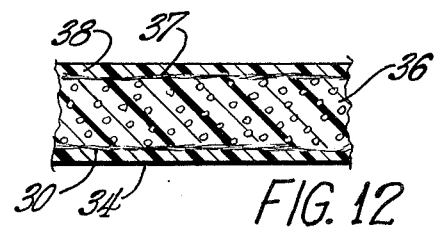
FIG. 12 shows a portion of the article molded in the apparatus shown in FIG. 11.

FIG. 11 shows an alternate system for molding the reinforced syntactic foam article. In this example fibrous reinforcing material 30 and the syntactic foam 32 are placed in the depression 22 in the female mold 8 as previously shown. However, an additional layer of fibrous reinforcing material 37 has been applied to the projecting surface 20 on male mold 12. FIG. 12 shows a portion of a part that has been molded from the alternate system shown in FIG. 11. In the molded article there is a resin rich skin 34 on one surface of the article. A layer of fibrous reinforcing material 30, behind the skin 34, to add strength to this surface of the article. A lightweight core 36 in the center of the article is made from a syntactic foam having a base of resinous material with hollow microspheres distributed throughout the resinous material. Another layer of fibrous reinforcing material 37 on the other side of the lightweight core is used to add strength to this surface of the article. And there is another resin rich skin 38 on the other exterior surface of the article. It should be noted that the layers of fibrous reinforcing material 30 and 37 may be substantially the same. When the fibrous reinforcing material is substantially the same the resinous material should move through the layers of reinforcement in approximately the same manner and at approximately the same rate. Under these conditions the resin rich skin on the surfaces of the article will be approximately the same. However, it is also possible to put different layers of fibrous reinforcing material in the article. For example, the type of reinforcing material or the amount of reinforcing put in each layer can be different than the reinforcement in the other layer. As the properties of the reinforcement layers varies so will the ability of the resin to pass through the reinforcement and also the ability of the reinforcement to block the passage of the microspheres. The properties and quantity of the fibrous reinforcement will also have a direct bearing on the strength of that section of the article. Therefore, if a thick tough skin is desired a reinforcing material will be used that allows a sufficient quantity of resinous material to pass through the reinforcement to form the desired skin. If a very strong area is required in the article the type and quantity of fibrous reinforcing material can be adjusted to provide this strength. The strength requirements and skin requirements may not always be complimentary. However it is felt that a suitable balance can be found between the strength and skin requirements. Especially by adjusting the type and quantity of fibrous reinforcing material, the type of resinous material used in the syntactic foam and the pressure under which the article is molded.

It would also be possible using this molding method to mold different contours on different sides of the article. To accomplish this it would be necessary to have different configurations on the molds used to make the article. This type of molded article could be very useful where different sides of the article were to serve a different function or where different designs were required on the sides of the article.

Figure 13:
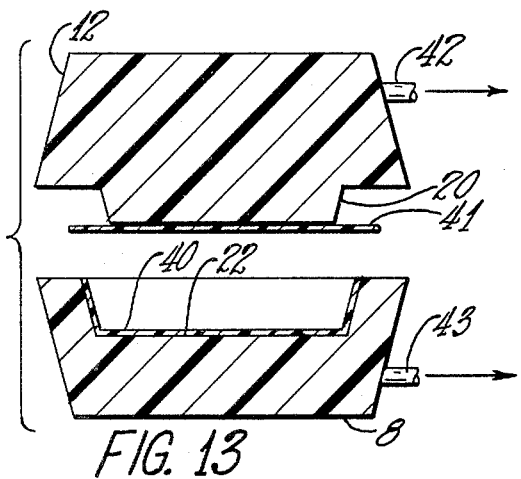
FIG. 13 shows a front view of the apparatus used to mold the article where the molds are in the open position and the molds have been modified to vacuum form a thermoplastic material.

FIG. 13 shows the male mold 12 and the female mold 8 provide with vacuum lines 42 and 43. The vacuum lines are used to draw a vacuum on the area of the depression 22 in the female mold 8 and in the area of the projecting surface 20 of the male mold 12. The pressure differential created by the vacuum in these areas can then be used to vacuum form a thin thermoplastic skin from a sheet of heated thermoplastic material. As shown in FIG. 13 there is a thermoplastic skin 40 formed in the depression 22 in the female mold 8 and a heated thermoplastic sheet 41 ready to be formed into a skin on the projecting surface 20 on the male mold 12. The thermoplastic skins are used to provide a tough skin, a good surface finish and a desired color on an article that is subsequently molded in the molds.

Figure 14:
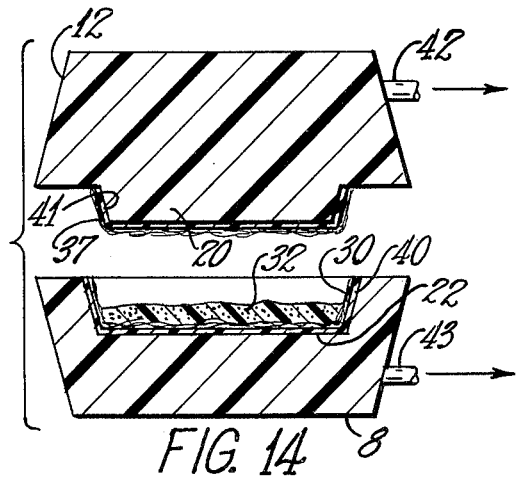
FIG. 14 shows a front view of the apparatus used to mold the article with an exterior thermoplastic skin.

FIG. 14 shows the molds in position to mold an article with the thermoplastic skins. There is the thermoplastic skin 40 in the depression 22 in the female mold 8. On top of the thermoplastic skin 40 there is a layer of fibrous reinforcing material 30 and the syntactic foam 32 which is made a liquid resinous material containing microspheres. On the male mold 12 there is the layer of thermoplastic material 41 on the projecting surface 20. Over the thermoplastic skin 41 there is affixed a layer of fibrous reinforcing material 37.

Figure 15:
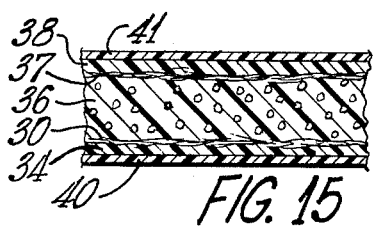
FIG. 15 shows a portion of the article mold in the apparatus shown in FIG. 14.

FIG. 15 shows a portion of the finished molded article that would be produced from the apparatus shown in FIG. 14. The molded article has an outer skin of thermoplastic material 40, a resin rich layer 34, a layer of fibrous reinforcing material 30, a lightweight syntactic foam core 36, a layer of fibrous reinforcing material 37, a resin rich layer 38 and another exterior skin of thermoplastic material 41. This article would be molded in the same manner as previously described. When the molding pressure is applied to the material in the mold cavity it will force the liquid resinous material through the fibrous reinforcing material to form a resin rich layer. However, in this case the resin rich layer will be formed next to a thermoplastic skin. The resin rich layer will thoroughly wet out the fibrous reinforcing material and penetrate through the reinforcement to thoroughly wet out and adhere to the thermoplastic skin to bond the thermoplastic skin to the rest of the article. The microspheres in the syntactic foam will stay in the core region of the article to produce a lightweight core because they cannot pass through the fibrous reinforcing material.

It should be noted that the same type and thickness of thermoplastic material can be used in the exterior skins 40 and 41. However, the type of thermoplastic material or the thickness of the material can be varied to suit the requirements of the finished article. If the exterior surface of the article is going to receive a great deal of abuse a very tough and strong thermoplastic material could be used to protect the surface of the article. If just a small amount of protection is required, a less durable thermoplastic material could be used. It would also be possible to vary the thermoplastic material used so the exterior skins would have different properties. In practice it has been found that acrylic materials work very well as the exterior thermoplastic skins. However, almost any thermoplastic that is vacuum formable could be used for the exterior skin.

The fibrous reinforcing material used could be substantially the same or it could be varied to give different properties to the article. The quantity and type of reinforcing material could be varied so that one area of the article would be stronger than another. Also, the reinforcement could be varied to allow more or less of the resinous material to pass through and thereby control the amount of resinous material that would be available to bond to the thermoplastic skin. From the above description it should be clear that a number of properties can be obtained in the finished article by varying the components used in making the article.

Figure 16:
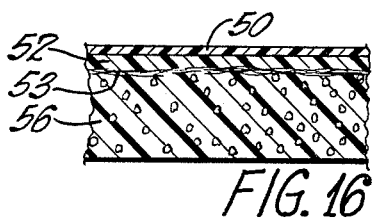
FIG. 16 shows a portion of an alternate article that could be molded in the apparatus shown in FIG. 14.
Figure 17:
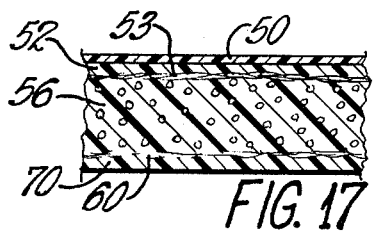
FIG. 17 shows a portion of an alternate article that could be molded in the apparatus shown in FIG. 14.

FIGS. 16 and 17 show additional variations that can be made in the molded article. In FIG. 16 there is a thermoplastic skin 50, a resin rich layer 52, a layer of fibrous reinforcing material 53 and a lightweight core of syntactic foam 56. This type of article would be useful where only one side of the article was going to receive abuse. The thermoplastic skin 50, a resin rich layer 52 and fibrous reinforcing material 53 would make that side of the article very tough, strong and abuse resistance. However, the other side of the article would have a surface of syntactic foam 56 which would be a good low cost lightweight surface for the side that does not receive a lot of wear and tear. FIG. 17 is an article with a thermoplastic skin 50, a resin rich area 52, a layer of fibrous reinforcing material 53, a lightweight syntactic foam core 56, a layer of fibrous reinforcing material 60 and a resin rich skin 70. The side of the article with thermoplastic skin 50 would be very strong, tough and wear resistent. The side with the resin skin 70 would not be as wear resistent as the side with the thermoplastic skin 50 but it would be able to withstand a considerable amount of wear. This type of article could be used where both sides of the article received a lot of wear and tear but where one side had to have additional protection. From these examples, it should be clear that an article can be molded to fit almost every need and physical requirement.

Figure 18:
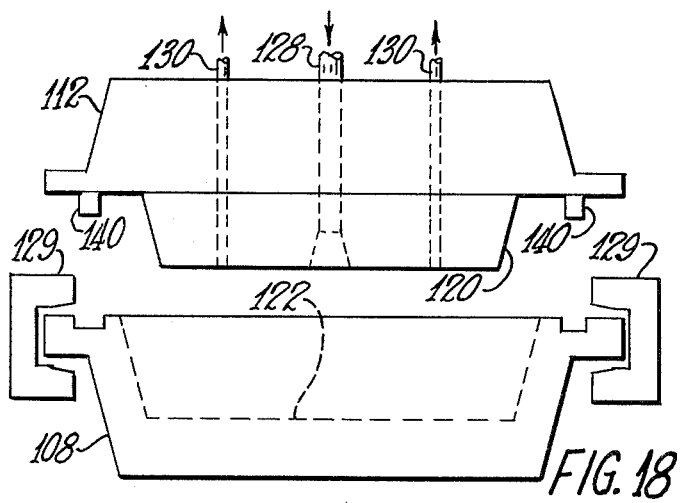
FIG. 18 shows a front view of an alternate molding apparatus where the molds are in the open position.
Figure 19:
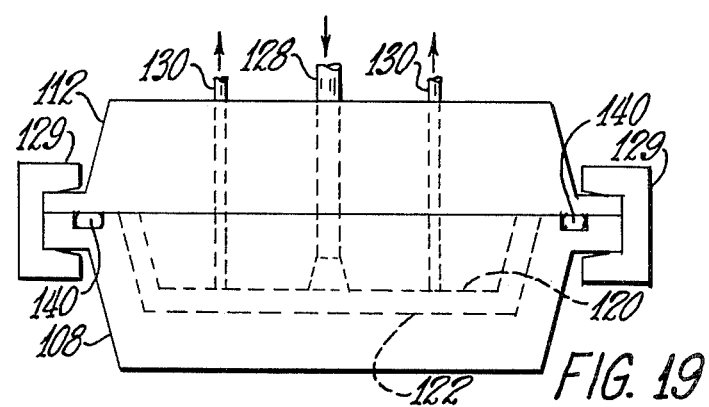
FIG. 19 shows a front view of an alternate molding apparatus where the molds are in the closed position.

FIGS. 18 and 19 show an alternative system that could be used to mold the reinforced syntactic foam parts. There is a female mold 108 and a male mold 112 shown that are used to mold the particle. The female mold 108 has depression 122 and the male mold 112 has a projecting surface 120 that fit together to form a molding cavity when the two molds are in mating relationship. There is an injection passageway 128 that is used to supply the syntactic foam to the mold cavity. There are also additional vent passageways 130 that are used to remove any air that is in the mold cavity when the syntactic foam is supplied to the molds. There are also seals 140 on the male mold 112 to help to prevent any leakage that may occur along the seam where the two molds are joined together. The seals 140 are made of a resilient material and will compress to form a tight seal when the two molds are brought together.

Figure 20:
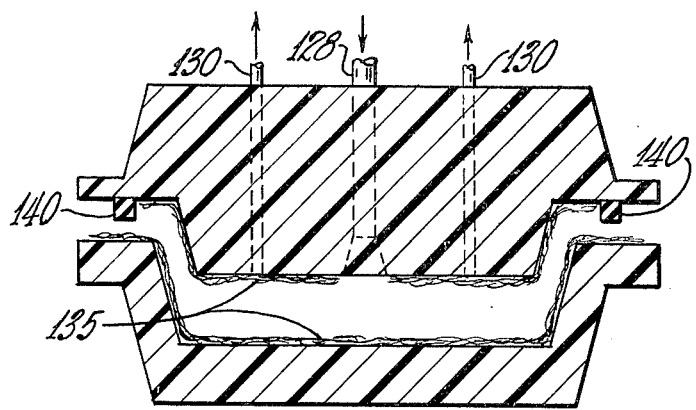
FIG. 20 is a front view of the molding cavity with fibrous reinforcing material in the cavity and the molds in the open position.
Figure 21:
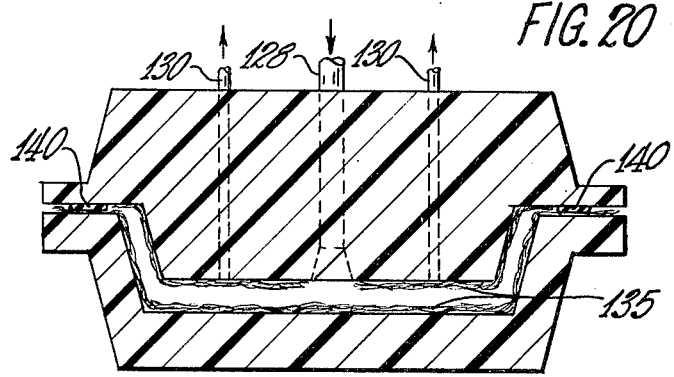
FIG. 21 is a front view of the molding cavity with fibrous reinforcing material in the cavity and the molds in the closed position.

In FIGS. 20 and 21 a fibrous reinforcing material 135 has been added to the surfaces of the mold cavity. The reinforcing material is secured to the surface of the cavity as it will not be displaced when the syntactic foam is injected into the cavity. When the molds are brought together the resilient seals 140 form an enclosed molding cavity. The syntactic foam which is formed from a resinous material containing microspheres is then injected into the enclosed mold cavity through injection passageway 128. Clamps 129 are used to secure the molds in their mating relationship so that the syntactic foam, injected into the mold cavity, will not cause the two molds to separate. The syntactic foam is injected under a pressure in the range of 50 to 150 psi. This pressure is great enough to force a portion of the resinous material through the fibrous reinforcement 135 without collapsing the microspheres. The microspheres are too large to pass through the reinforcing material so they stay in the center or core region of the molded article. When the mold cavity is filled with the syntactic foam, air in the mold cavity will be forced out through the vent passageways 130. When the mold cavity is filled with syntactic foam the resinous material will start to come out through the vent passageways 130. When this happens the vent passageways 130 should be plugged or shut off and some additional syntactic foam pumped into the mold cavity. The additional syntactic foam will be necessary to insure that the syntactic foam is under enough pressure to work properly. The resinous material that passes through the fibrous reinforcing material 135 will form a resin rich skin on the surface of the finished article.

Figure 22:
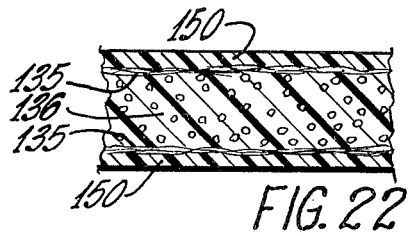
FIG. 22 shows a portion of the article mold in the mold cavity shown in FIG. 21.

A finished mold article is shown in FIG. 22 where there are resin rich skins 150 on the exterior of the article. These skins are very hard and tough and provide a protective surface on the article. Underneath the skins are layers of fibrous reinforcing material 135. The fibrous reinforcing material adds strength to that region of the finished article. In the center of the article there is syntactic foam 136 that acts as a lightweight core for the article.

It should be noted that there is no fibrous reinforcing material 135 right under the injecting passageway 128 because a layer of reinforcing material in this area would not allow the microspheres to pass into the core of the article. Instead the microspheres would be trapped on the reinforcing material and would clog up the injection of the syntactic foam. By removing the reinforcing material from this area the syntactic foam can easily be injected into the mold cavity. If it is necessary to have reinforcing material in this area it would be possible to relocate the injection inlet to accommodate this change. An injection inlet located somewhere along the seam between the two molds would work very well. It would also be possible to provide the injection passageway with a check valve so that the syntactic foam would not flow back into the passageway after the injection process had stopped. This would help to keep the material in the mold cavity under pressure while it was curing.

It should be noted that the fibrous reinforcing material 135 used in the article would be varied on either side of the article to provide various strengths and resin rich surfaces on the article. And that reinforcing material could be used on only one side of the article. It is also possible that a thermoplastic skin could be used on either or both sides of the article. With all the possible combinations an article can be molded that will suit a variety of needs.

Having described the invention in detail and with reference to particular materials, it will be understood that such specifications are given for the sake of explanation. Various modifications and substitutions other than those cited may be made without departing from the scope of the invention as defined by the following claims.

I claim:
1. A composite article comprising:
   a layer of low density syntactic foam comprising a resinous material and a low density filler;
   a reinforcing layer comprising fibrous reinforcing material superimposed on the layer of syntactic foam and penetrating thereinto; and,
   an outer skin of resinous material penetrating the reinforcing layer and the layer of syntactic foam, the resinous material of the layer of syntactic foam and the outer skin being a continuous phase in the composite article.
2. The article of claim 1 wherein the layer of syntactic foam contains hollow microspheres.
3. The article of claim 1 wherein the layer of syntactic foam contains milled glass fibers.
4. The article of claim 2 wherein the resinous material of the layer of syntactic foam and the outer skin is a polyester resin.
5. The article of claim 1 wherein the resinous material of the layer of syntactic foam and the outer skin is an epoxy resin.
6. The article of claim 2 wherein there is at least 1% by weight of microspheres in the layer of syntactic foam.
7. The article of claim 2 wherein there is no greater than 15% by weight of microspheres in the layer of syntactic foam.
8. The article of claim 2 wherein the microspheres are at least 10 microns in diameter.
9. The article of claim 2 wherein the microspheres are no greater than 130 microns in diameter.

* * * * *